(12) United States Patent
Jeng

(10) Patent No.: US 7,647,265 B2
(45) Date of Patent: Jan. 12, 2010

(54) INVESTMENT ALLOCATION SYSTEM, ANALYSIS MODULE AND METHOD THEREOF

(75) Inventor: Jen-Her Jeng, Linnei Township, Yunlin County (TW)

(73) Assignee: Sifeon Knowledge Technology, Taichung (TW)

( * ) Notice: Subject to any disclaimer, the term of this patent is extended or adjusted under 35 U.S.C. 154(b) by 92 days.

(21) Appl. No.: 11/806,276

(22) Filed: May 31, 2007

(65) Prior Publication Data

US 2008/0052250 A1    Feb. 28, 2008

(30) Foreign Application Priority Data

Aug. 24, 2006    (TW) ............................... 95131214 A

(51) Int. Cl.
    *G06Q 40/00*    (2006.01)
(52) U.S. Cl. .................................................. 705/36 R
(58) Field of Classification Search ................... 705/36, 705/36 R
    See application file for complete search history.

(56) References Cited

U.S. PATENT DOCUMENTS 7,337,135 B1 *    2/2008    Findlay et al. ............ 705/36 R
2005/0171883 A1 *   8/2005    Dundas et al. ................ 705/36

* cited by examiner

*Primary Examiner*—Richard C Weisberger
(74) *Attorney, Agent, or Firm*—Wang Law Firm, Inc.; Li K. Wang

(57) ABSTRACT

An investment allocation system, analysis module and method thereof for allocation of a total investment are disclosed. The investment allocation system comprises an input module, an analysis module and a allotment amount computation mode. The input module is used to input the historical data of a benchmark asset and multiple financial assets, and a threshold. The analysis module is used to calculate an adaptivity of each financial asset according to the threshold, and historical data of the benchmark asset and those financial assets. The allocation amount computation module is used to calculate an allocation ratio for each financial asset according to those adaptivities, related data, and a ratio computation procedure and the allocation ratio each of those financial assets being multiplied by the total investment to produce the amount of allocation for each financial asset.

4 Claims, 6 Drawing Sheets

INVESTMENT ALLOCATION SYSTEM, ANALYSIS MODULE AND METHOD THEREOF

BACKGROUND OF THE INVENTION (a) Field of the Invention

The present invention is related to an investment allocation system, analysis module and method thereof, and more particularly, to analysis module and method thereof for calculating adaptivity of a financial asset and a system and its method to allocate investment pro rata according to an adaptivity of the financial assets.

(b) Description of the Prior Art

As the living standard gets higher, investment and finance would receive more attention. Therefore, many securities agencies and bankers offer various types of financial assets including funds, stocks and securities, the futures, foreign exchange, bonds, options, and subscription certificates to investors. However so far there is the absence of an effective analysis system to help investor to analyze characteristics of a financial asset, e.g., level of consistent growth, consistent level of fluctuations, or adaptability level depending on a particular environment of the economy. Investor only can rely upon the past performance of a financial asset when making subjective judgments about if the financial asset justifies the investment. There is no resolution to objectively judge the characteristics of the financial asset or to make comparison between two assets for investment allocation.

Furthermore, the performance of the same financial asset varies depending on the economic conditions it faces at different times; that is, to determine whether a financial asset yields exact the same performance of return of investment (ROI) in a bull market and in a bear market, different assessments must be provided to achieve results of objective analysis. Unfortunately, up to now there is no such an analysis system to offer the function of providing objective analysis.

This inventor having been engaging in the research and development of financial investment and hands-on experience for years discloses an investment allocation system with its analysis module and method to bring a total solution for coping with those deficiencies as described above.

SUMMARY OF THE INVENTION

The primary purpose of the present invention is to provide an investment allocation system with analysis module and method thereof for analyzing adaptivity of a financial asset that indicates the level of maintaining a consistent growth in the price of the financial asset with interest rate discount for the investor to make the optimal allocation of investment amount.

To achieve the purpose, the present invention relates to an investment allocation system to make allocation from a total investment. The system includes an input module, an analysis module, and an allocation computation module. Wherein, a plurality of financial assets and data of their historical are input into the input module. The analysis module contains a threshold and historical data of a benchmark asset. Based on the threshold, the historical data of the benchmark asset, and the historical data of those financial assets, the analysis module calculates an adaptivity of each of those financial assets. Finally, the allocation computation module calculates an allocation ratio of each of financial assets according to those adaptivities and a ratio computation procedure. Each allocation ratio of financial assets is multiplied by the total investment respectively to produce an allocation of investment of each financial asset.

The present invention further provides an investment allocation method to allocate a total investment. The method is comprised of the following steps: firstly a plurality of financial assets and their historical data are input; an adaptivity of each financial asset is calculated according to a threshold, the historical data of a benchmark asset and those financial assets; an allocation ratio of each financial asset is then calculated based on at least the adaptivities and a ratio computation procedure; and finally the allocation ratio of each financial asset is multiplied by the total investment to produce the allocation of investment of each financial asset.

The present invention further produces an analysis module for calculating an adaptivity of a financial asset including a first numeric sequence comprised of multiple numbers. The analysis module includes a receiving unit, a storage unit, an interest rate discount computation unit, a maximal draw-down (MDD) computation unit, and a numeric value operation unit. The receiving unit is for receiving the first numeric sequence. The storage unit is for storing a benchmark asset, a threshold and an interest rate sequence. The benchmark asset includes a second numeric sequence comprised of multiple numbers. The interest rate discount computation unit calculates a first interest rate discount sequence corresponding to the first sequence and a second interest rate discount sequence corresponding to the second sequence according to the interest rate sequence respectively. The max draw-down computation unit calculates a first maximal drop-down numeric sequence corresponding to the first numeric sequence, a second maximal drop-down numeric sequence corresponding to the first interest rate discount sequence, a third maximal drop-down numeric sequence corresponding to the second numeric sequence and a fourth maximal drop-down numeric sequence correspond to the second interest rate discount sequence respectively. The numeric operation unit performs operation on the first, the second, the third and the fourth maximal drop-down numeric sequences based on a procedure of mathematical calculation procedure to produce an adaptivity of the financial asset.

The present invention also discloses an analysis method to calculate an adaptivity of a financial asset containing a first numeric sequence comprised of multiple numbers. The method includes the following steps: firstly a benchmark asset containing a second numeric sequence comprised of multiple numbers is provided; a first interest rate discount sequence corresponding to the first sequence and a second interest rate discount sequence corresponding to the second sequence according to the interest rate sequence are calculated according to a interest rate sequence; a first maximal drop-down numeric sequence corresponding to the first numeric sequence, a second maximal drop-down numeric sequence corresponding to the first interest rate discount sequence, a third maximal drop-down numeric sequence corresponding to the second numeric sequence and a fourth maximal drop-down numeric sequence correspond to the second interest rate discount sequence are calculated; using an operation procedure and a threshold to operate the first, the second, the third and the fourth maximal drop-down numeric sequences for generating an adaptivity.

The adaptivity indicates the level of maintaining a consistent growth in the price of the financial asset with interest rate discount. The historical data of benchmark asset may be the weighted average of any group of global stock market index, world bonds index, world raw materials index, world real estate index, and world currencies.

An advantage of present invent is that the adaptivity of a financial asset is analyzed under different economic condition by referring to the benchmark asset.

Another advantage of present invent is that the investment allocation can be performed objectively and digitally by calculating the adaptivity of the financial asset.

To make it easier for our examiner to understand the objective of the invention, its structure, innovative features, and performance, we use preferred embodiments together with the attached drawings for the detailed description of the invention.

BRIEF DESCRIPTION OF THE DRAWINGS

A general architecture that implements the various features of the invention will now be described with reference to the drawings. The drawings and the associated descriptions are provided to illustrate embodiments of the invention and not to limit the scope of the invention. Throughout the drawings, reference numbers are re-used to indicate correspondence between referenced elements. In addition, the first digit of each reference number indicates the figure in which the element first appears.

DETAILED DESCRIPTION OF THE PREFERRED EMBODIMENTS

It is to be noted that to facilitate understanding, the same device whenever appears in any of the preferred embodiments of the present invention is marked with the same symbol.

Figure 1:
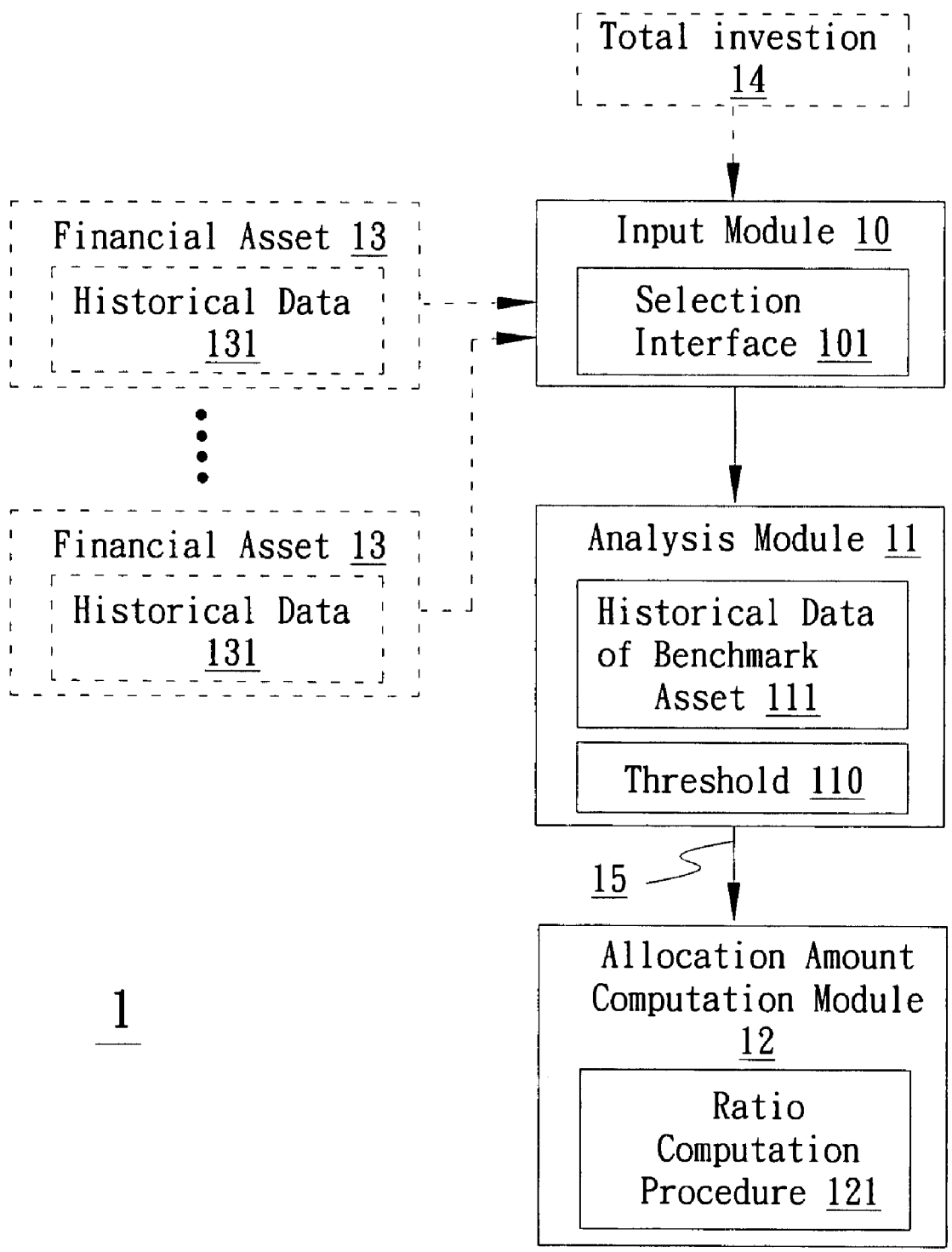
FIG. 1 is a block chart of an investment allocation system of the present invention.

Referring to FIG. 1 for a block chart of an investment allocation system of the present invention, an investment allocation system 1 for performing allocation for a total investment 14 includes an input module 10, an analysis module 11, and an allocation amount computation module 12. The total investment 14, a plurality of financial assets 13 and their historical data 131 are entered into the input module 10. The analysis module 11 containing a threshold 110 and a historical data 111 of a benchmark asset calculates an adaptivity 15 of each financial asset 13 based on the threshold 110, the historical data 111 of a benchmark asset, and the historical data 131 of those financial assets. The allocation amount computation module 12 calculates an allocation ratio of each financial asset 13 based on the adaptivity 15, a ratio computation procedure 121, and then the allocation ratio of each financial asset 13 is multiplied by the sum of investment 14 to produce the allocation amount for each financial asset 13. A selection interface 101 may be provided to the input module 10 as applicable for a user to select the desired benchmark asset from those financial assets 13 for investment.

The financial asset 13 may be one of funds, stocks and securities, futures, foreign exchange, bonds, options, and subscription certificates. The historical data are preferred to be that of traded prices at a plurality points of time of the financial asset 13, and The historical data of benchmark asset are preferred to be the weighted average of any group of global stock market index, world bonds index, world raw materials index, world real estate index, and world currencies. The ratio computation procedure involves normalization of the adaptivity of each financial asset to produce a normalized parameter, which becomes the allocation ratio of the financial asset.

Figure 5:
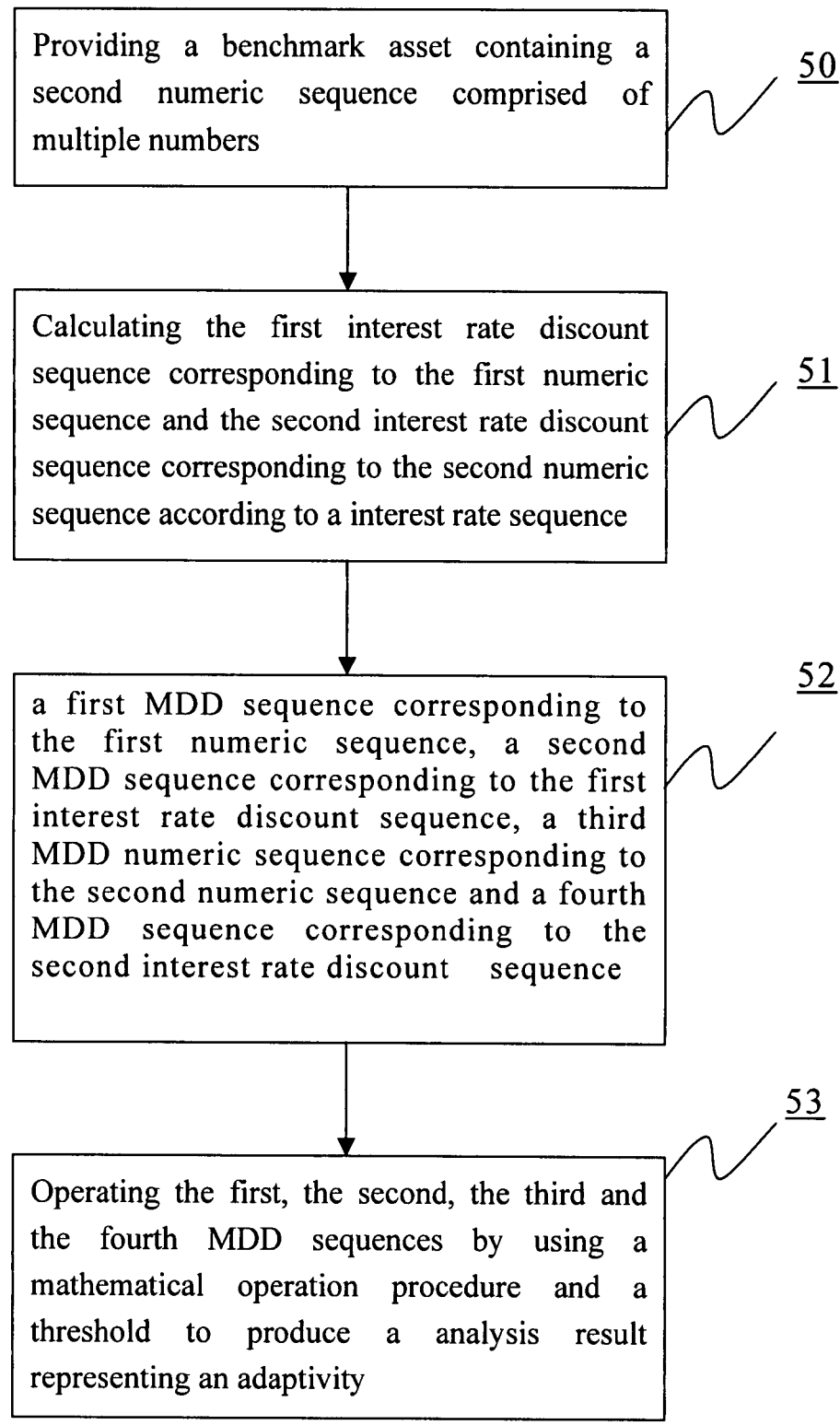
FIG. 5 is a flow chart of an analysis method of the present invention.

The adaptivity 15 represents the level of consistent growth of the price of the financial asset 13 with interest rate discount. The adaptivity 15 also can represent the level for the price of the financial asset 13 to consistently grow related to the benchmark asset. By reference of the benchmark asset, the investment allocation system 1 is capable of achieving objective analysis to reveal the adaptivity of the financial asset under different economic conditions. The computation process for the adaptivity 15 is as illustrated in FIG. 5 and will be discussed later.

Figure 2:
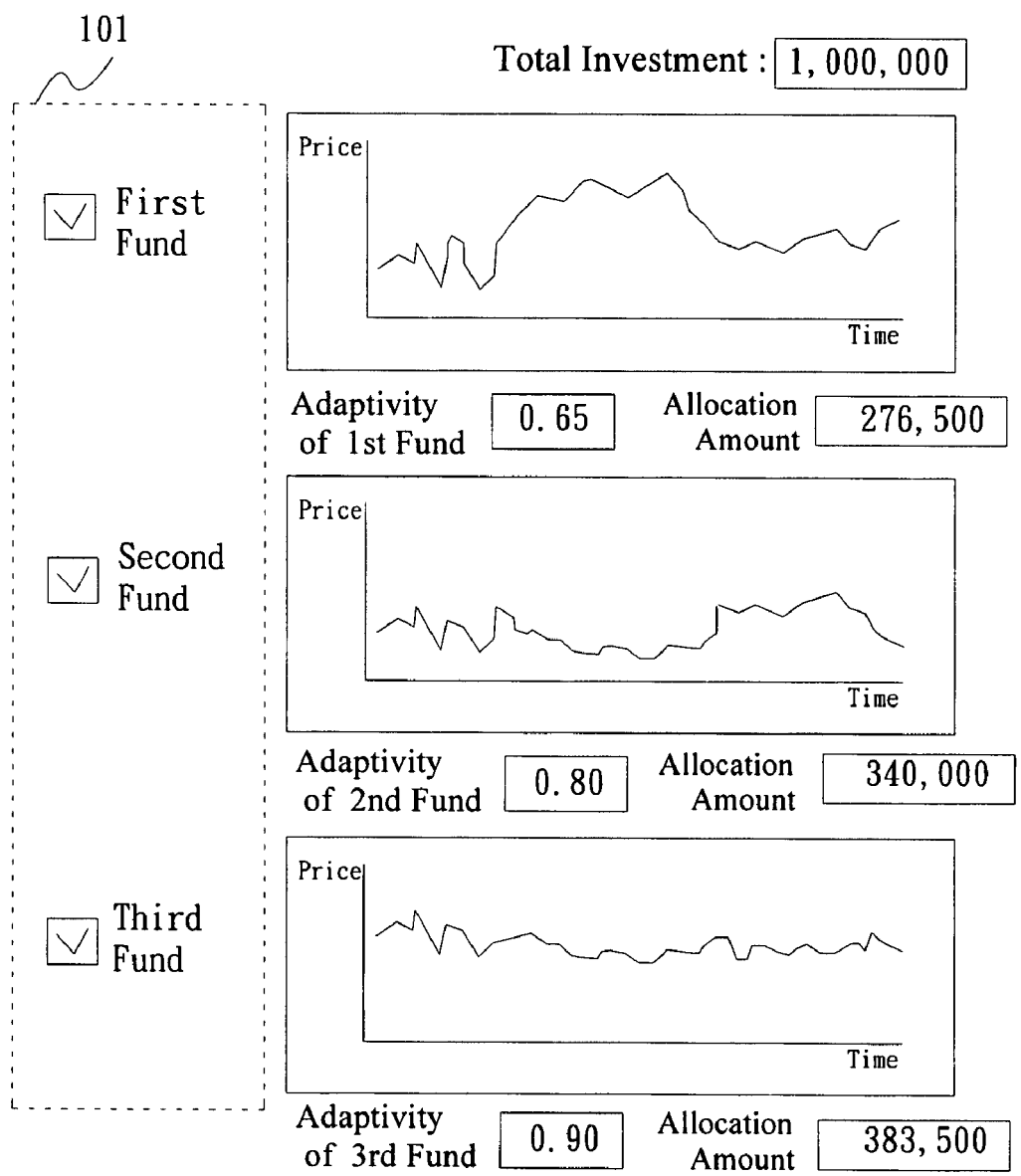
FIG. 2 is a schematic view showing an operation interface for the investment allocation system of the present invention.

The investment allocation system 1 may further contain an operation interface as applicable. As illustrated in FIG. 2, an operation interface 11 includes an selection interface 101 to provide more lots of funds, e.g., a first fund, a second fund, and a third fund as illustrated for investment selection. The operation interface 101 also displays a chart 20 of historical traded prices and the adaptivity of each fund. As illustrated, the adaptivity of the first fund is 0.65, the second fund, 0.80, and the third fund, 0.90. Therefore, a normalized adaptivity of each of these three funds is as follows:

$$0.2765=0.65/(0.65+0.80+0.9)$$

$$0.34=0.8/(0.65+0.80+0.9)$$

$$0.3835=0.9/(0.65+0.80+0.9)$$

Given with a total investment at $1,000,000 and with these three normalized adaptivities as the allocation ratios, $276,500, $340,000 and $383,500 are allocated to the first fund, the second fund and, the third fund respectively.

The investment allocation system 1 may further include data regarding the level of risk exposure sustainable by an investor. According to depend on the data of the sustainable risks, the ratio computation procedure may perform a weighting operation for the adaptivity of each financial asset to produce a weighted adaptivity, and normalizes these weighted adaptivity to generate the normalized adaptivity serving as the allocation ratio for the financial asset. For example, if the risk exposure sustainable by the investor is low, a financial asset with a higher adaptivity may be adjusted up to a higher weighted ratio and another financial asset with a lower adaptivity may be adjusted to a lower weighted ratio.

Now referring to FIG. 2, because the first fund has the lowest adaptivity and the third fund has the highest adaptivity, a conservative investor who has lower level to sustain price drop may adjust the weighted ratios among these three funds to 1.1:1:0.9 with their corresponding weighted adaptivities respectively as follows:

$$0.585=0.65\times0.9$$

$$0.8=0.8\times1$$

$$0.99=0.9\times1.1$$

Three normalized adaptivities respectively for three known weight adaptivities are then respectively calculated as follows:

$$0.2463=0.585/(0.585+0.80+0.99)$$

$$0.3368=0.8/(0.585+0.80+0.99)$$

$$0.4168=0.99/(0.585+0.80+0.99)$$

Again, given with the total investment at $1,000,000 and three normalized adaptivities as allocation ratios, the investment amount allocated to three funds are respectively, $246,300 for the first fund; $336,800, the second fund; and $416,800, the third fund. By changing the weighted ratio to respectively raise and reduce the investment amounts allotted to the third fund and the first fund. The investment allocation system of the present invention can provide the optimal investment allocation according to the characteristics of a certain financial asset and the risks the investor can take.

Figure 3:
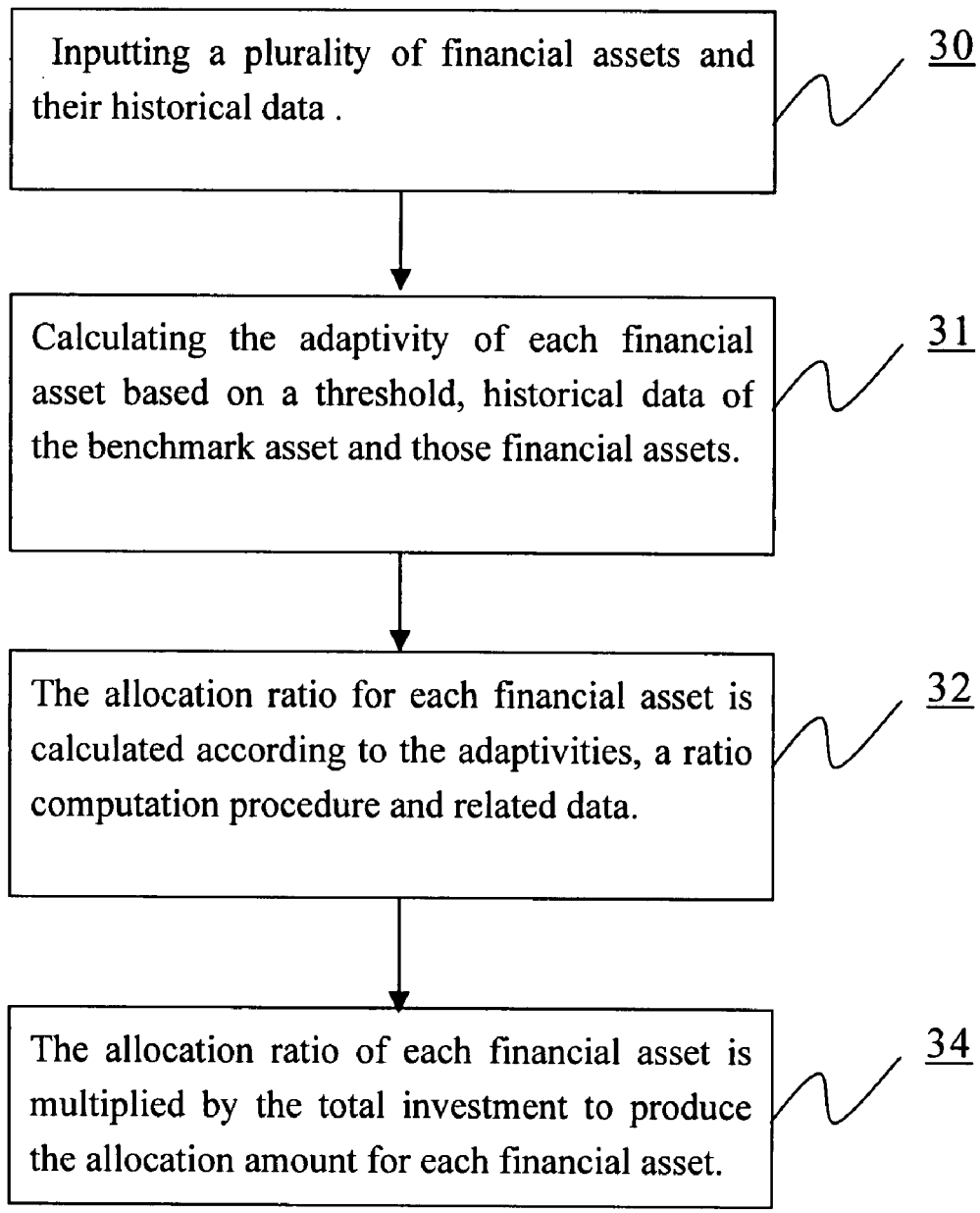
FIG. 3 is a flow chart of an investment allocation method of the present invention.

FIG. 3 shows a flow chart of steps of a method of the present invention for allocating a total investment. The investment allocation method includes the following steps:

Step 30: A plurality of financial assets and their historical data are input;

Step 31: an adaptivity of each financial asset is calculated based on a threshold, and historical data of a benchmark asset and those financial assets;

Step 32: an allocation ratio is calculated for each financial asset based on those adaptivities calculated in Step 31 and a ratio computation procedure;

Step 33: the allocation ratio for each financial asset is multiplied by the total investment to produce an investment amount allocated for each financial asset.

Figure 4:
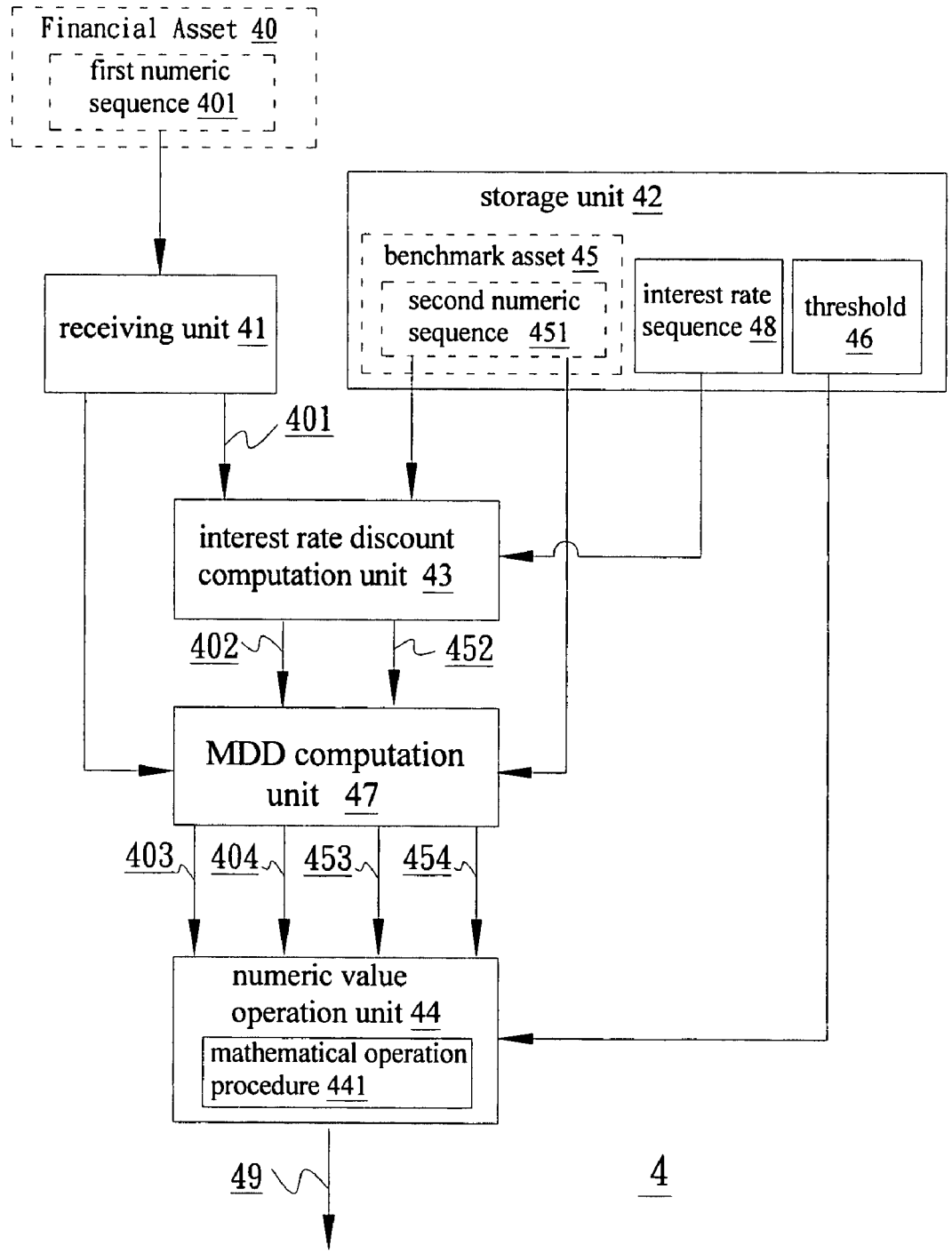
FIG. 4 is a block chart of an analysis module of the present invention.

In a schematic view of an analysis module of the present invention as illustrated in FIG. 4, the analysis module 4 is operated to calculate an adaptivity of a financial asset 40. The financial asset 40 includes a first numeric sequence 401 comprised of multiple numbers. The analysis module 4 includes a receiving unit 41, a storage unit 42, an interest rate discount computation unit 43, a maximal drop-down (MDD) computation unit 47, and a numeric value operation unit 44. The receiving unit 41 receives the first numeric sequence 401. The storage unit 42 stores a benchmark asset 45, a threshold 46 and an interest rate sequence 48, wherein the benchmark asset 45 includes a second numeric sequence comprised of multiple numbers. The interest rate discount 43 calculates a first interest rate discount sequence 402 corresponding to the first numeric sequence 401 and a second interest rate discount sequence 452 corresponding to the second numeric sequence 451

The MDD computation unit 47 calculates a first numeric sequence of MDD 403 corresponding to the first numeric sequence 401, a second numeric sequence of MDD 404 corresponding to the first interest rate discount sequence 402, a third numeric sequence of MDD 453 corresponding to the second numeric sequence 451 and a fourth numeric sequence of MDD 454 corresponding to the second interest rate discount sequence 452. The numeric value operation unit 44 operates the first MDD numeric sequence 403, the second MDD numeric sequence 404, the third MDD numeric sequence 453 and the fourth MDD numeric sequence 454 according to a mathematical operation procedure 441 and the threshold 46 for generating an analysis result 49 to represent the adaptivity of the financial asset 40. The adaptivity indicates the level of consistent growth of the price of the financial asset 40 with interest rate discount.

An analysis method for calculating an adaptivity of a financial asset is comprised of those steps according to a flow chart as illustrated in FIG. 5. The financial asset contains a first numeric sequence comprised of multiple numbers. As illustrated, the analysis method of the present invention includes the following steps:

Step 50: a benchmark asset including a second numeric sequence comprised of multiple numbers is provided;

Step 51: a first interest rate discount sequence corresponding to the first numeric sequence and a second interest rate discount sequence corresponding to the second numeric sequence are calculated according to an interest rate sequence; and Step 52: a first MDD numeric sequence corresponding to the first numeric sequence, a second MDD numeric sequence corresponding to the first interest rate discount sequence, a third MDD numeric sequence corresponding to the second numeric sequence and a fourth MDD numeric sequence corresponding to the second interest rate discount sequence are calculated; and Step 53: A mathematical operation procedure and a threshold are used to operate the first, the second, the third and the fourth MDD sequences for generating an adaptivity.

Figure 6:
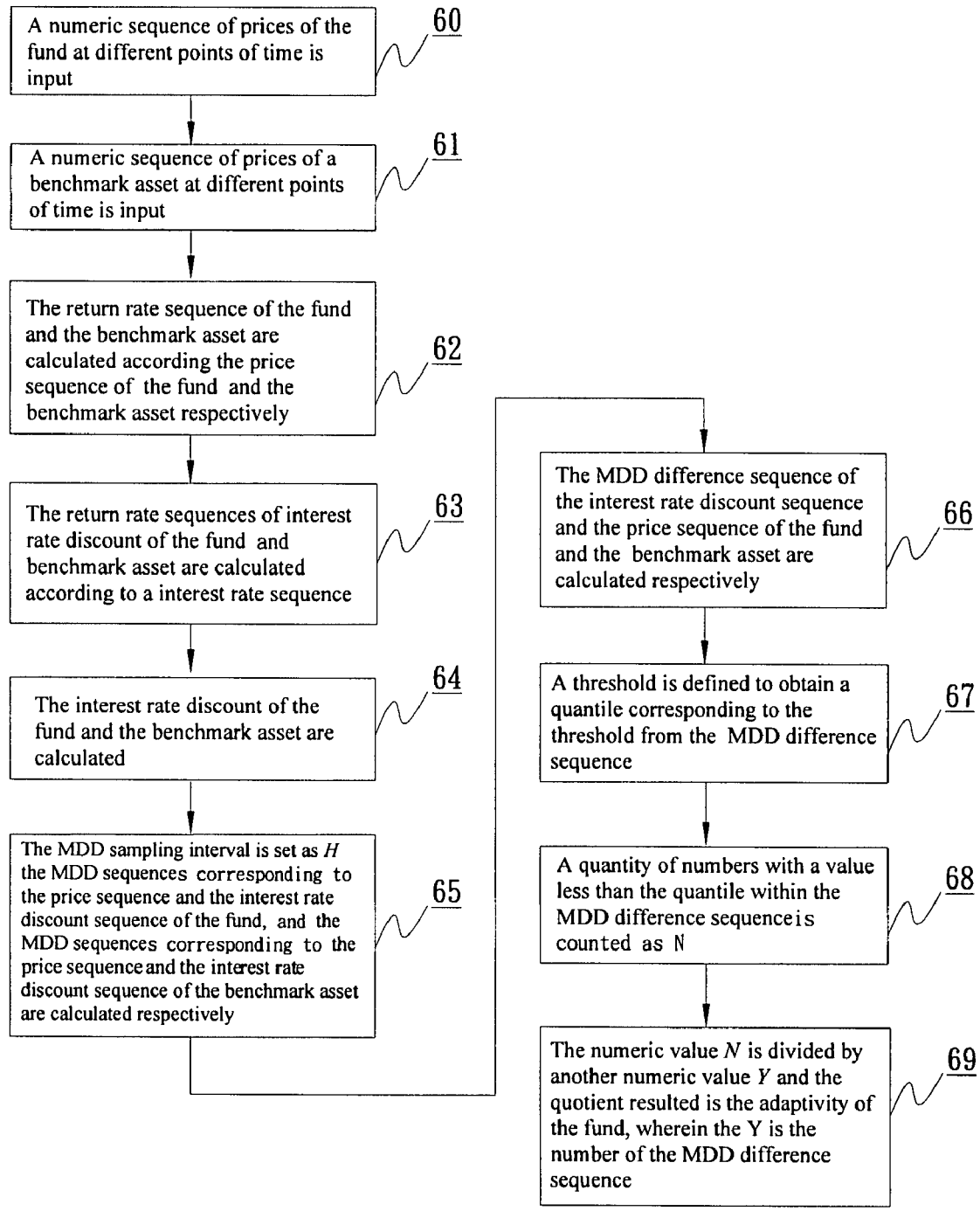
FIG. 6 is a flow chart of a preferred embodiment of the analysis method of the present invention.

As illustrated in FIG. 6 for a flow chart showing a preferred embodiment of the analysis method of the present invention, the method for analyzing an adaptivity of a fund includes the following steps:

Step 60: A numeric sequence of prices of the fund at different points of time, $V_1, V_2 \ldots V_H \ldots V_{Y+H+1}$ is input; wherein $V_1$ relates to a price of the fund at a point of time (1), $V_H$ relates to a price of the fund at a point of time (H), and $V_{Y+H+1}$ relates to a price of the fund at a point of time (Y+H+1);

Step 61: A numeric sequence of prices of a benchmark asset at different points of time, $V_1', V_2' \ldots V_H' \ldots V_{Y+H+1}'$ is input; wherein $V_1'$ relates to a price of the benchmark asset at a point of time (1), $V_H'$ relates to a price of the benchmark asset at a point of time (H), and $V_{Y+H+1}'$ relates to a price of the benchmark asset at the point of time (Y+H+1);

Step 62: the return rate sequence of the fund $R_1, R_2, \ldots, R_H \ldots, R_{Y+H+1}$ and the return rate sequence of the benchmark asset $R_1', R_2', \ldots, R_H', \ldots R_{Y+H+1}'$ from the point of time (1) until the point of time (Y+H+1) are calculated according the price sequence of the fund and the benchmark asset respectively, $R_1$ relates to a return rate of the fund at a point of time (1), $R_1'$ relates to a return rate of the benchmark asset at a point of time (1);

Step 63: the return rate sequence of interest rate discount of the fund $R_1, Rd_2, \ldots, Rd_H, \ldots, Rd_{Y+H+1}$ and the return rate sequence of interest rate discount of the benchmark asset $Rd_1', Rd_2', \ldots, Rd_H', \ldots, RD_{Y+H+1}'$ from the point of time (1) until the point of time (Y+H+2) are calculated, wherein $Rd_1$ relates to an return rate of interest rate discount of the fund at a point of time (1), $Rd_1'$ relates to an return rate of interest rate discount of the benchmark asset at a point of time (1);

Step 64: the interest rate discount of the fund $Vd_1, Vd_2, \ldots, Vd_H, \ldots, Vd_{Y+H+1}$ and the interest rate discount of the benchmark asset $Vd_1', Vd_2', \ldots, Vd_H', \ldots, Vd_{Y+H+1}'$ are calculated according to the return rate sequence of interest rate discount of the fund $Rd_1, Rd_2, \ldots, Rd_H, \ldots, Rd_{Y+H+1}$ and the return rate sequence of interest rate discount of the benchmark asset $Rd_1', Rd_2', \ldots, Rd_H', \ldots, Rd_{Y+H+1}'$, wherein $Vd_1$, relates to a price of interest rate discount of the fund at a point of time (1), $Vd_1'$ relates to a price of interest rate discount of the benchmark asset at a point of time (1);

Step 65: the MDD sampling interval is set as H (i.e., an MDD calculated from each continuous H lots of price), and the MDD sequence, $MDD_H, MDD_{H+1} \ldots MDD_{Y+H+1}$ of the price sequence of the fund, and the MDD sequence, $MDDd_H, MDDd_{H+1} \ldots MDDd_{Y+H+1}$ of the interest rate discount sequence of the fund, and the MDD sequence, $MDD'_H, MDD'_{H+1} \ldots MDD'_{Y+H+1}$ of the price sequence of the benchmark asset, and the MDD sequence, $MDDd'_H, MDDd'_{H+1} \ldots MDDd'_{Y+H+1}$ of the interest rate discount of the benchmark asset within a time frame commencing from the point of time (H) until the point of time (Y+H+1) are calculated;

Step 66: a sequence, $DA_H, DA_{H+1} \ldots DA_{Y+H+1}$ is obtained by subtracting the MDD sequence of the interest rate discount sequence of the fund from the MDD sequence of the price sequence of the fund, wherein $DA_H = MDDd_H - MDD_H$, similarly, a sequence, $DA'_H, DA'_{H+1} \ldots DA'_{Y+H+1}$ is obtained by subtracting the MDD sequence of the interest rate discount sequence of the benchmark asset from the MDD sequence of the price sequence of the benchmark asset, wherein $DA_H = MDDd_H - MDD_H$ Step 67: a threshold between 0~1 is defined to obtain a quantile corresponding to the threshold from the sequence $DA'_H \ldots DA'_{Y+H+1}$;

Step 68: a quantity of numbers with a value less than the quantile within the MDD difference sequence $DA_H, DA_{H+1} \ldots DA_{Y+H+1}$ is counted to obtain a numeric value N; and Step 69: the numeric value N is divided by another numeric value Y and the quotient resulted is the adaptivity of the fund.

An adaptivity indicates the level of a financial asset price capable of consistent growth with interest rate discount.

Accordingly, to judge which fund between the first fund and the second fund is likely to grow consistently in price with interest rate discount, those steps disclosed above may be employed to respectively calculate the adaptivity of the first and the second funds. If the adaptivity of the first fund is greater than that of the second fund, the price of the first fund compared to the second fund could have better chance for consistent growth. Therefore, for a conservative investor who can take only lower risk may increase his investment in the first fund.

All those preferred embodiments given herein are only for examples without being restrictive; and any equivalent modification or alteration to those preferred embodiment within the spirits and scope of the present invention should be deemed as falling within the scope of claims to be claimed hereafter.

What is claimed is:

1. An analysis module for calculating an adaptivity of a financial asset containing a first numeric sequence comprised of multiple numbers, comprising:
    a receiving unit, for receiving said first numeric sequence;
    a storage unit, for storing a benchmark asset containing a second numeric sequence comprised of multiple numbers, a threshold and an interest rate sequence;
    an interest rate discount computation unit, for calculating a first interest rate discount sequence corresponding to said first numeric sequence and a second interest rate discount sequence corresponding to said second numeric sequence respectively according to said interest rate sequence;
    a maximal draw-down (MDD) computation unit, for calculating a first MDD sequence corresponding to said first numeric sequence, and a second MDD sequence corresponding to said first interest rate discount sequence, and a third MDD sequence corresponding to said second numeric sequence and a fourth MDD sequence corresponding to the second interest rate discount sequence respectively; and
    a numeric value operation unit, for operating said first MDD sequence, said second MDD sequence, said third MDD sequence and said fourth MDD sequence based on a mathematical operation procedure and a threshold to produce said adaptivity,
    wherein the adaptivity being produced by
    obtaining a first differential sequence by subtracting each element of the second MDD sequence from a corresponding element of the first MDD sequence,
    obtaining a second differential sequence by subtracting each element of the fourth MDD sequence from a corresponding element of the third MDD sequence,
    obtaining a quantile from the first differential sequence according to the threshold,
    counting a number of the elements in the second differential sequence that are smaller than the quantile, and
    dividing the counted number by a preset value.

2. The analysis module as claimed in claim 1, wherein said financial asset is selected from funds, stocks and securities, futures, foreign exchanges, bonds, options, and subscription certificates.

3. The analysis module as claimed in claim 1, wherein those numbers included in said first numeric sequence are related to trade prices of said financial asset at multiple points of time, and said interest rate sequence comprises interest rate at said points of time.

4. The analysis module as claimed in claim 1, wherein said historical data of a benchmark asset includes the weighted average of any group of global stock market index, world bonds index, world raw materials index, world real estate index, and world currencies.

* * * * *